United States Patent
Grosset et al.

[11] Patent Number: 5,733,491
[45] Date of Patent: Mar. 31, 1998

[54] EXTRUSION DEVICE AND PROCESS FOR TWO-LAYER SECTION MEMBERS

[75] Inventors: Jean-Claude Grosset; Roland Berrod, both of Oyonnax, France

[73] Assignee: Grossfillex S.A.R.L., Oyonnax, France

[21] Appl. No.: 628,991

[22] Filed: Apr. 10, 1996

[30] Foreign Application Priority Data

Apr. 14, 1995 [FR] France .................. 95 04535

[51] Int. Cl.$^6$ .................. B29C 47/06; B29C 47/20
[52] U.S. Cl. .................. 264/172.1; 264/173.17; 264/177.16; 264/209.8; 425/113; 425/131.1; 425/380; 425/462
[58] Field of Search .................. 264/172.1, 171.26, 264/173.17, 209.8, 177.16, 177.1; 425/113, 131.1, 462, 380

[56] References Cited

U.S. PATENT DOCUMENTS

| | | | |
|---|---|---|---|
| 2,859,476 | 11/1958 | Lainson | 425/462 |
| 4,100,243 | 7/1978 | Wissinger et al. | 264/173.17 |
| 4,118,166 | 10/1978 | Bartrum | 264/173.17 |
| 4,130,976 | 12/1978 | Kesseler et al. | 264/171.26 |
| 4,189,520 | 2/1980 | Gauchel | 428/520 |
| 4,208,175 | 6/1980 | Rosenbaum | 425/462 |
| 4,280,801 | 7/1981 | Wheeler et al. | 425/462 |
| 4,296,062 | 10/1981 | Gauchel et al. | 264/209.8 |
| 4,462,778 | 7/1984 | Calcagni | 425/462 |
| 4,655,987 | 4/1987 | Zertuche | 264/209.8 |
| 4,723,902 | 2/1988 | Erickson | 264/171.26 |
| 4,738,611 | 4/1988 | Briggs | 264/171.26 |
| 5,186,876 | 2/1993 | Purstinger et al. | 264/173.17 |
| 5,364,254 | 11/1994 | Vezzoli et al. | 264/171.26 |

FOREIGN PATENT DOCUMENTS

| | | |
|---|---|---|
| 0 435 786 | 7/1991 | European Pat. Off. . |
| 0 548 549 | 6/1993 | European Pat. Off. . |
| 22 65 035 | 1/1976 | Germany . |
| 36 16 444 | 11/1987 | Germany . |

OTHER PUBLICATIONS

Designing Profile Dies For Coextrusion, Brown et al., Plastics Engineering, Sep. 1981, pp. 25–29.

Preliminary Search Report issued in connection with the French application which is the priority appication corresponding to the above–identified patent application.

*Primary Examiner*—Jeffery R. Thurlow
*Attorney, Agent, or Firm*—Wolf, Greenfield & Sacks, P.C.

[57] ABSTRACT

An extrusion device for making a section member of complex section that includes an internal portion and an outer layer. The device includes a first inlet channel for a first molten plastics material, a body including an extrusion channel whose wall defines the external outline of the section member, and an axial extrusion core that serves to define the internal outline of the section member. The device also includes a second inlet channel for a second molten plastics material, and means for adjusting the flow of said second molten plastics material in the second inlet channel so as to ensure uniform distribution of the second plastics material around the external outline of the section member at the outlet end of the second inlet channel.

10 Claims, 6 Drawing Sheets

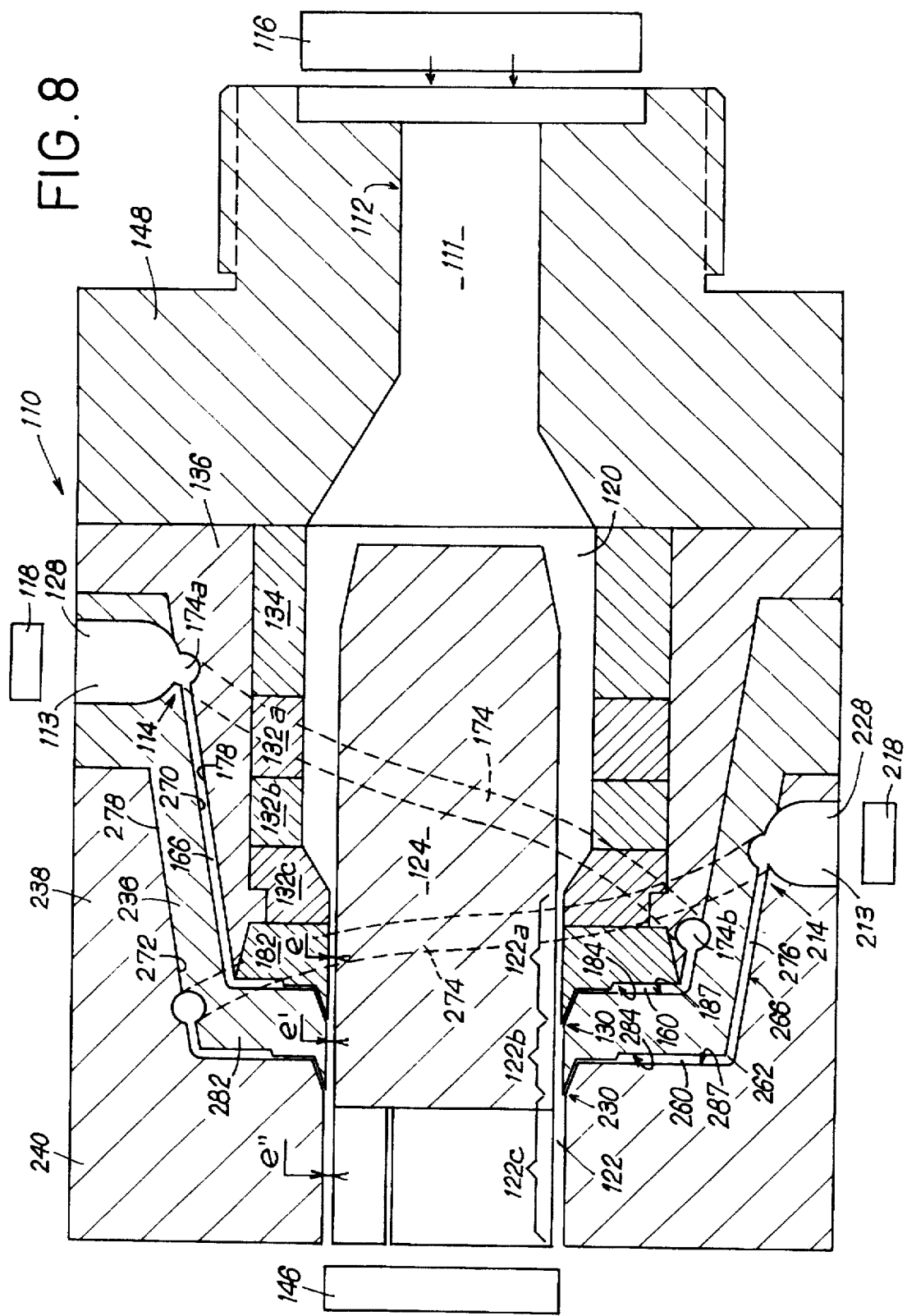

EXTRUSION DEVICE AND PROCESS FOR TWO-LAYER SECTION MEMBERS

The present invention relates to an extrusion device for making a hollow section member having an external outline which, in right section, comprises a plurality of segments, being made up of an internal portion made of a first plastics material and at least one outer layer made of a second plastics material and extending over at least a "covered" portion of said external outline.

BACKGROUND OF THE INVENTION

In numerous applications, for example section members for windows or casings, it is necessary for the external appearance of the section member to satisfy quality criteria that are particularly strict. For example, when it is desired to provide colored section members, it is necessary for the color to be conserved well over time. Insofar as ordinary color pigments do not withstand weather and light for a sufficient length of time, this requirement makes it necessary to use pigments that are particularly long-lasting, and therefore of considerably greater cost. The use of such pigments in conventional single-layer section members, whether pigments are not only visible at the surface but are also embedded throughout the thickness, constitutes a solution that is economically disadvantageous since the major fraction of the expensive pigment is not visible.

Consequently, it is necessary to manufacture section members having an internal portion made of a first plastics material that is cheap, while only the outer layer contains the color pigments and is made of a second plastics material that is more expensive.

It may be observed that the color problem mentioned above is merely one example of an application of the invention, and that in more general terms it can be advantageous to manufacture section members having an internal portion made of a first plastics material associated with an outer layer made of a different, second plastics material. Thus, the first plastics material may be constituted by recycled plastic, whereas the second plastics material can be of better quality. The two plastics materials may also differ in their mechanical properties. Nevertheless, they must be compatible.

It should also be observed that it may be desired to cover only some faces of the section member, e.g. those faces that are visible once the member has been put into place.

European patent application No. 0 435 786 discloses an extrusion device comprising:

a first inlet channel;

a first extruder for feeding the first inlet channel with a first molten plastics material;

a body that comprises, in succession on an axis in the flow direction of the first plastics material, an intermediate channel connected to the first inlet channel, and an extrusion channel whose wall has a plurality of longitudinal facets serving to define the external outline of the section member;

an axial extrusion core having a first length located in the intermediate channel, and a second length located in the extrusion channel, the gap left between said second length and the wall of the extrusion channel serving to define the shape of the section member, the second length of the core defining the internal outline and the wall of the extrusion channel defining the external outline of said section member;

a second inlet channel having an inlet and an outlet end connecting with the extrusion channel; and a second extruder designed to feed the second inlet channel with a second molten plastics material.

The device includes means for controlling the flow of the second plastics material in the second inlet channel and for ensuring that said second plastics material is uniformly distributed over said covered portion of the external outline of the section member at the outlet end of the second inlet channel. The device also includes an inner hollow part having a through hole through which the extrusion core passes, and an outer hollow part suitable for engaging on said inner hollow part, said parts, when engaged one with the other, forming between them a distribution channel for the second plastics material. Said channel constitutes a portion of the second inlet channel and comprises a first portion in the form of two helical half-turns that are symmetrical about a plane of symmetry of the outer periphery of the inner hollow part, with their two ends meeting in said plane to form a continuous casting passageway, the first junction zone between the half-turns being situated behind the second junction zone and being directly coupled to the inlet of the second inlet channel.

The distribution channel further includes a second portion extending between the casting passageway and the front end of said channel, and constituted by the gap left between the facing faces of the outer periphery of the inner part and the inner periphery of the outer part.

Known devices of the above type are unsuitable for making "two-layer" section members that are relatively complex in shape, e.g. of the type used for window frames or casings, i.e. of the type in which the outline has a plurality of segments and not merely the shape of a curve that is circular or nearly circular. If it is attempted to make use of the above devices for making such complex-shaped section members merely by changing extrusion nozzles, then the two plastics materials mix in practically random manner and the resulting section members have large portions in which only one of the two plastics is present.

Such known devices are usable only for section members that are very simple in shape, having an overall axis of symmetry.

OBJECTS AND SUMMARY OF THE INVENTION

The present invention seeks to remedy those drawbacks and to enable section members to be manufactured in which the internal portion effectively defines the kernel or core of the section member and in which the outer layer covers said kernel to the desired thickness and is present over its entire outline, or at least over those portions of the outline where such a layer is necessary and desired.

This object is achieved by the facts that the inner hollow part includes a front end portion having a front face which extends substantially radially between the front end of the distribution channel and the extrusion channel;

that the device includes a downstream part provided with a through hole whose outline constitutes, at least in an axial length thereof, the wall of the extrusion channel, said downstream part having a back face that is substantially radial and situated facing the front face of said front end portion;

that the second inlet channel includes an adjustment length constituted by the gap left between the back face of the downstream part and the front face of the front end portion; and that said adjustment length has variations in its section constituting means for acting on a substantially uniform flow rate of the second plastics material over the front end of the distribution channel to adjust the flow speed of the second plastics material towards a given facet of the wall of the extrusion channel as a function of the distance measured along the flow path of the second plastics material between the inlet of the adjustment length and said facet, the variations in the section of the adjustment length being implemented by means of at least one projecting zone occupying at least one of the faces between which the adjustment length is provided and locally reducing the section thereof.

By means of these dispositions, the second plastics material spreads uniformly so as to form the outer layer of the section member, and all of the zones of said member that are indeed to be covered in the outer layer are covered in uniform manner.

It may be that certain portions of the section member are not to be covered in the second plastics material. If said portions are faces of the section member, then the second inlet channel can be organized so as to avoid opening out into said faces, with lengths of the outlet end of said channel corresponding to said faces being closed off.

If such zones are smaller, such as the insides of grooves or slots, then the extrusion nozzle can be organized in such a manner as to be slightly different in shape from that of the extrusion channel where the second inlet channel runs into the extrusion channel, e.g. by adding new ribs, so that in the final section member, grooves are formed that are free from coating. Such grooves may be portions of the section member that are not visible and in which sealing gaskets are subsequently disposed, e.g. when the section member is used for making a window frame.

To make section members having n (where n is greater than 1) outer layers (e.g. of different colors over different portions of the external outline, or a plurality of superposed layers having different mechanical characteristics), the device can be fitted with n+1 inlet channels, i.e. with the above-mentioned first and second inlet channels, plus n−1 additional inlet channels that are of overall shape generally similar to that of the second inlet channel and that have respective outlet ends that run into the extrusion channel in succession going from the upstream end towards the downstream end.

The invention also provides a method of making a hollow section member of the above-specified type in which the extrusion device of the invention is used, the first inlet channel being fed with the first molten plastics material, said first plastics material being caused to flow along the intermediate channel and along the extrusion channel so as to extrude the internal portion of the section member, and the second extruder is used to feed the second inlet channel with the second molten plastics material, with said second plastics material being caused to flow along the extrusion channel on said internal portion of the section member so as to extrude the outer layer of said member over its internal portion.

BRIEF DESCRIPTION OF THE DRAWINGS

The invention will be well understood and its advantages will appear more clearly on reading the following detailed description of embodiments given by way of non-limiting examples. The description refers to the accompanying drawings, in which:

FIG. 8 is a section analogous to the section of FIG. 2, showing a variant device fitted with a third inlet channel.

MORE DETAILED DESCRIPTION

Figure 2:
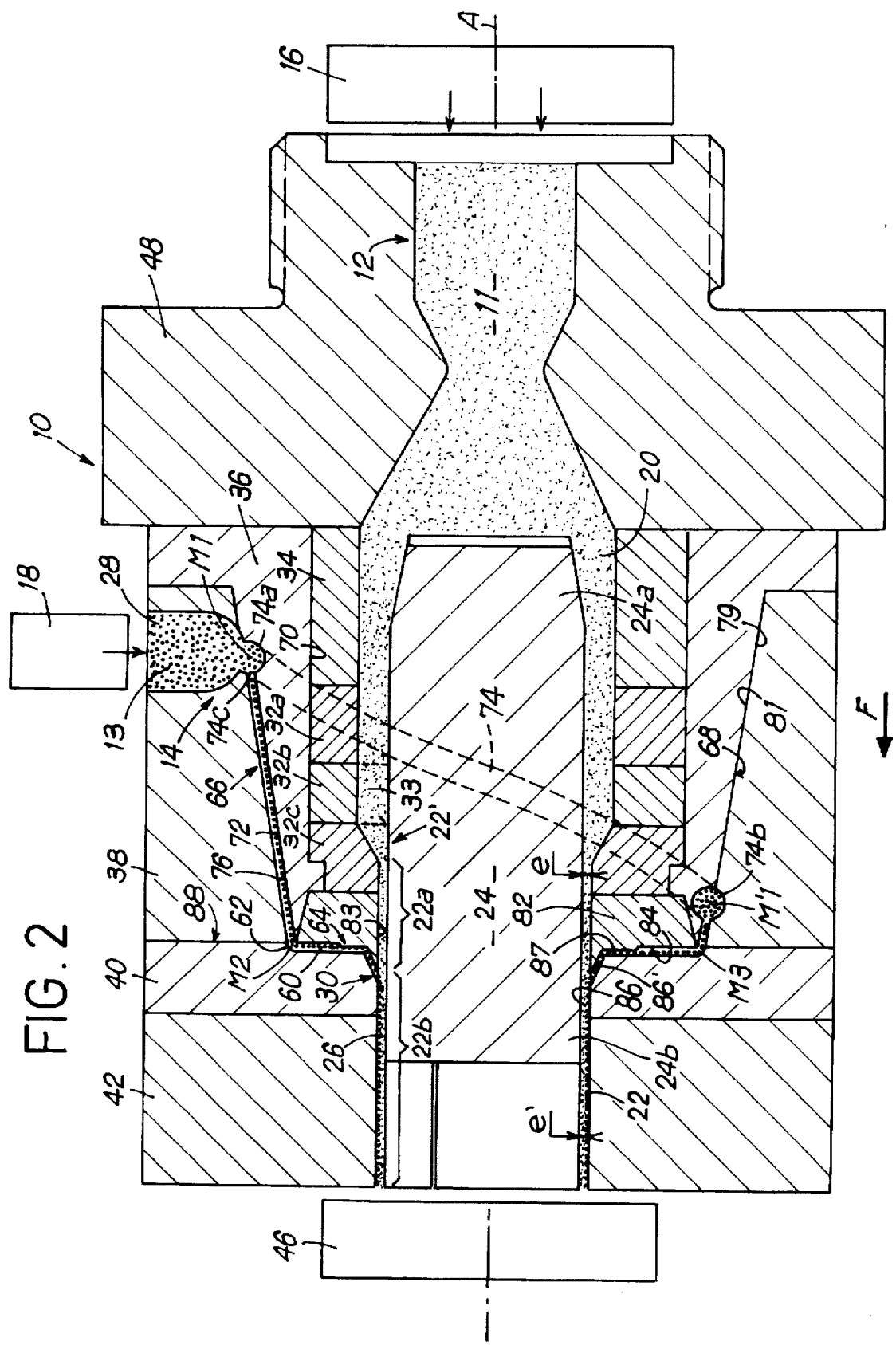
FIG. 2 is an axial section through the device of the invention.

With reference initially to FIG. 2, it can be seen that the device comprises a body 10, a first inlet channel 12 for a first molten plastics material 11, and a second inlet channel 14 for a second molten plastics material 13. First and second extruders, represented symbolically, and respectively designated by references 16 and 18, are designed respectively to feed the first inlet channel with the first molten plastics material and the second inlet channel with the second molten plastics material.

In axial succession in the flow direction of the first plastics material as indicated by arrow F, the body 10 comprises an intermediate channel 20 connected to the first inlet channel 12, and an extrusion channel 22 whose wall has a plurality of longitudinal facets (not shown in the section view) that serve to define the external outline of the section member manufactured by means of the device.

Below, the positions of the various elements (front, back, upstream, downstream) are defined throughout relative to the flow direction F.

In conventional manner, the device also includes an axial extrusion core 24 having a first length 24a disposed in the intermediate channel 20, and a second length 24b disposed in the extrusion channel 22. The gap 26 formed between the second length 24b and the wall of the extrusion channel 22 serves to define the shape of the section member. Thus, the second length of the core defines the internal outline of the section member while the wall of the extrusion channel defines its external outline.

The second inlet channel 14 has an inlet 28 connected to the second extruder 18 and an outlet end 30 connected to the extrusion channel 22. Thus, the second plastics material 13 comes into contact with the first plastics material when the internal portion of the section member has already been defined by the extrusion channel and core. The coupling zone between the outlet end of the second inlet channel and the extrusion channel may be situated at the inlet 22' of the extrusion channel, or else, as in the example shown, slightly downstream from said inlet, such that a first extrusion channel portion 22a is provided in which the internal portion of the section member takes shape. In the second portion 22b of this channel, both layers of the section member are present.

Figure 1:
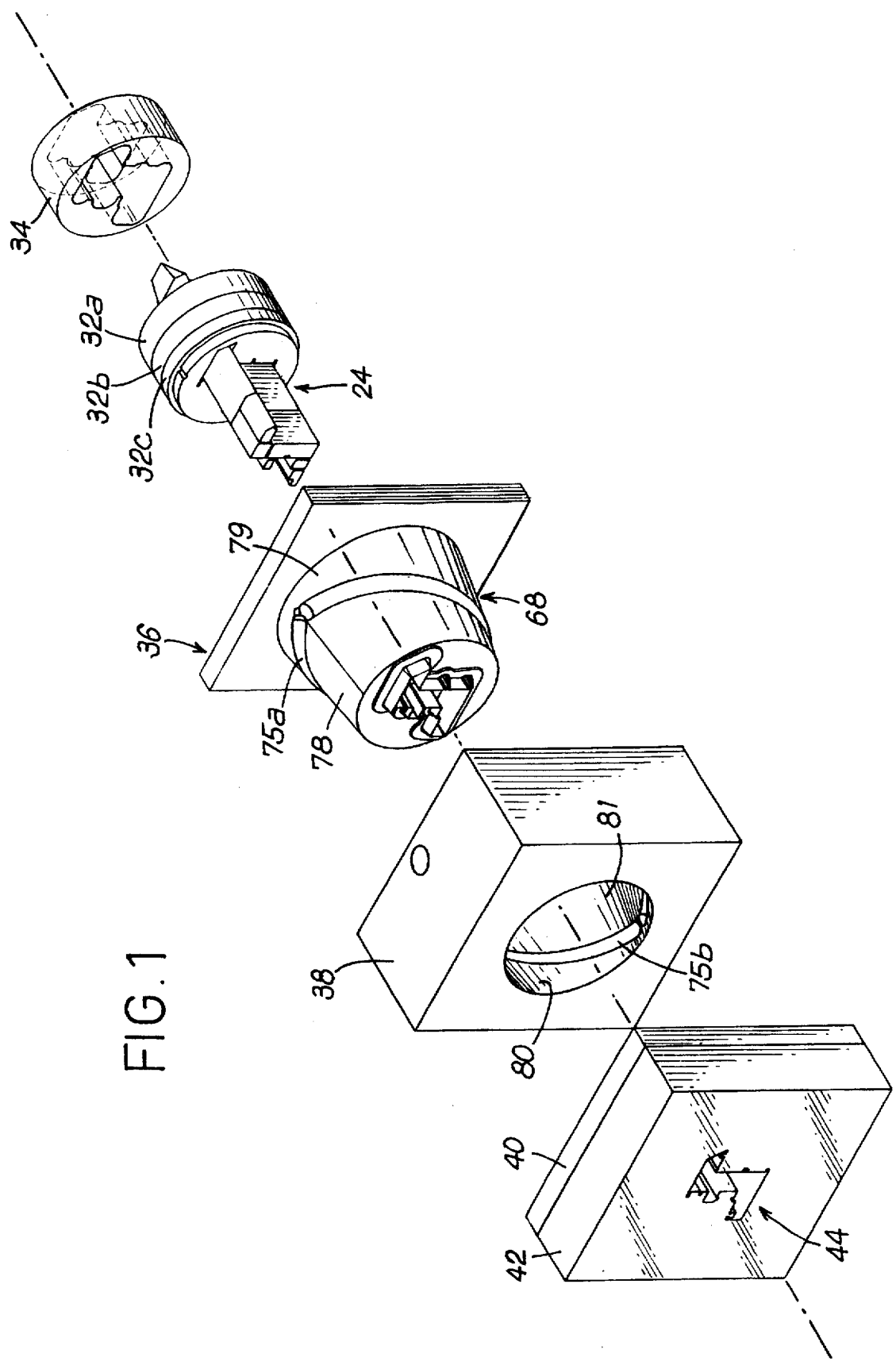
FIG. 1 is an exploded perspective view of the main parts of the extrusion device.

As can be seen on looking at FIG. 1, the extrusion device is constituted by an assembly of parts that are stacked or interfitted together and that are fixed relative to one another. Thus, the extrusion core 24 is mounted in rings referenced 32a, 32b, and 32c going from the upstream end to the downstream end in the flow direction F of the first plastics material.

Another ring 34 is mounted against the ring 32a. The first length 24a of the core extends substantially from the ring 34 to the ring 32c. The internal peripheries of these rings define the intermediate channel 20 whose shape varies progressively from the upstream end towards the downstream end so as to define substantially the external outline of the section member.

Similarly, the shape of the first length 24a of the extrusion core also varies progressively from its upstream end to its downstream end so as to define the internal outline of the section member. Starting from the ring 32c, the core and the extrusion channel retain substantially the same shape: the shape that is to be given to the section member. The rings are mounted inside an internal hollow part 36 which is itself engaged in an outer hollow part 38, described in greater detail below.

The extrusion core is supported in the extrusion channel by supporting webs or ribs such as web 33 represented by dashed lines and connecting it to the internal periphery of the ring 32b.

Starting from the zone where the second inlet channel is coupled to the extrusion channel, the wall of said channel is defined by the internal periphery of two parts 40 and 42 that are fixed to each other, the outlet end of the downstream part 42 defining the extrusion nozzle 44 which imparts the final shape to the section member. At the outlet from this nozzle, the downstream elements of the extrusion die, e.g. comprising a calibrating and cooling unit together with a section member advance system, are represented symbolically and given overall reference 46. In the example, an upstream hollow part 48 is connected to the upstream face of the internal part 36, and is provided with an axial bore constituting the first inlet channel 12 and coupled to the intermediate channel 20.

The device includes means for controlling the flow of the second plastics material 13 in the second inlet channel 14 and for determining uniform distribution of said second plastics material at the outlet end 30 of the channel 14 around the external outline of the section member.

Figure 6:
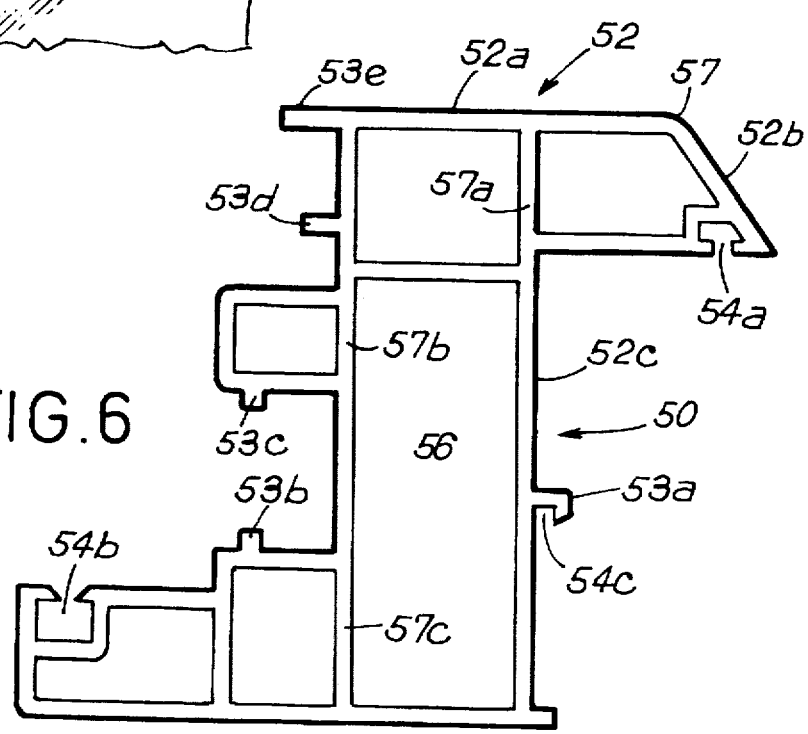
FIG. 6 is a section showing a section member made using the device of FIGS. 1 and 2 when fitted with the nozzle of FIG. 5.

FIG. 6 shows the right cross-section of this member 50. It can be seen that its external outline 52 comprises a plurality of mutually sloping segments, with only some of the segments 52a, 52b, 52c being given numerical references in order to simplify the figure. The external outline also has ribs 53a, 53b, 53c, and 53d, and grooves 54a, 54b, and 54c.

The internal portion 56 of the section member 50, constituting the kernel thereof, is made out of the first plastics material. In conventional manner, it includes empty spaces and connecting webs, only some of which are shown under references 57a, 57b, or 57c. The section member also includes an outer layer 57 made of a second plastics material. To facilitate representation thereof, given that said outer layer is fine relative to the thickness of the various walls of the section member, it is symbolized merely by a bold line. It can be seen that it extends uniformly over nearly all of the outline of the section member. Only certain specific zones are free thereof, such as the insides of the grooves 54a, 54b, 54c, with this being deliberate and due to a special configuration given to the extrusion nozzle, as explained below.

The second inlet channel 14 includes an adjustment length 60 having an inlet 62 which is provided with means for controlling the flow speed of the second plastics material 13 towards a given face of the wall of the extrusion channel 32 and as a function of the distance, as measured along the flow path of the second plastics material, between the inlet 62 of the adjustment length and said facet. The flow path is the path followed by the second plastics material to go from the inlet of the adjustment length of the second inlet channel to the outline face of the section member that it is going to cover.

These means for adjusting the flow speed are advantageously constituted by variations in the section of the adjustment length of the second inlet channel. In FIG. 2 it can be seen that one of the walls of the adjustment length includes a step 64 reducing the section of said length at determined locations for reducing the flow speed at said locations. Thus, the second adjustment length includes a first portion of given section, over which the flow speed is substantially constant at all points, and a second portion of smaller section over which the flow speed is slowed down. The shape of said second portion is adapted to the outline of the section member that is to be covered by means of the second plastics material.

Optionally, said adjustment length may be implemented over substantially all of the second inlet channel so as to adjust the flow speed of the second plastics material directly between the inlet 28 of the second inlet channel 14 and the section member.

Nevertheless, the second inlet channel advantageously includes a distribution channel 66 whose outlet constitutes a generally annular zone situated around the extrusion channel and in which the flow speed is made uniform. The outlet from this distribution channel 66 thus constitutes the inlet to the adjustment length 60, thereby making it possible to facilitate speed adjustment since it is performed starting from a flow speed that is uniform around a perimeter surrounding the section member. Thus, in the example shown, the outlet from the distribution channel is constituted by its substantially annular front end designated by reference 62 since that also constitutes the inlet to the adjustment length 60. The distribution channel includes means for ensuring that the second plastics material has a flow rate over said front end that is substantially uniform.

In the embodiment shown, this substantially uniform flow rate is determined by shaping the distribution channel in two portions. Thus, the inner hollow part 36 has an outer periphery 68 that is generally in the form of a rearwardly-flaring truncated cone, i.e. a cone that flares in the direction opposite to arrow F in FIG. 2. The part 36 has a through hole 70 along which the extrusion core 24 passes. As can be seen in FIG. 2, the internal periphery of the through hole 70 serves as a support for the above-mentioned rings 34, 32a, 32b, and 32c within which a portion of the extrusion core is located.

The outer hollow part 38 is suitable for engaging with the inner hollow part 36, and for this purpose it includes a through hole 72 in which the generally frustoconical outer periphery of the part 36 is received. Once these two parts are mutually engaged in this way, a gap remains between the outer periphery 68 of the part 36 and the inner periphery 72 of the part 38. This space constitutes the distribution channel 66. The first portion 74 of said distribution channel is a passageway in which the second plastics material flows relatively fast, while its second portion 76 is of a section that ensures that the flow therein is slower.

FIG. 2 is an axial section on a plane including the geometrical axis A of the extrusion channel. The plane of the section constitutes a plane of symmetry of the truncated cone which corresponds to the overall shape of the outer periphery 68 of the internal hollow part 36. In this plane, two ends 74a and 74b of the passageway 74 are intersected, with the hidden half of the passageway being represented by dashed lines. It can thus be seen that half of the passageway 74 is in the form of a helical half-turn having a rearmost first end 74a directly connected to the inlet 28 of the second inlet channel 14. The shape of the second half of the passageway 74 is symmetrical relative to the section plane of FIG. 4. The overall shape of the passageway can be seen more clearly in FIGS. 1 and 3. The two ends of each half-turn are connected to the two ends of the other half-turn, in junction zones that correspond to the ends 74a and 74b shown in FIG. 2, such that the casting passageway is continuous.

As can be seen more clearly in FIG. 1, the casting passageway is implemented in the form of a first groove 75a constituted by two helical half-turns and formed in the outer periphery 68 of the part 36, and by a second groove 75b of analogous shape formed in the internal periphery 72 of the part 38. When the two parts are engaged one within the other, the two grooves face one another, each contributing half of the substantially circular section of the passageway 74. A passageway of the same type could be obtained by machining only one groove of greater depth either in the outer periphery 68 of the part 36 or in the internal periphery 72 of the part 38.

The second portion 76 of the distribution channel extends between said casting passageway 74 and the front end 72 of said channel, and is constituted by the gap left between the two frustoconical surfaces having the same angle at the apex that are formed respectively by the outer periphery 68 of the part 36 and the internal periphery 72 of the part 38, extending ahead of the casting passageway. These two frustoconical surfaces are given respective references 78 and 80.

Going from the front to the back, the outer periphery 68 of the part 36 has a first frustoconical surface 78, the groove 75a, and a second frustoconical surface 79. In similar manner, the internal periphery 72 of the part 38 has a first frustoconical surface 80, the groove 75b, and a second frustoconical surface 81. As can be seen better in FIG. 2, when the part 36 is engaged in the part 38, the frustoconical surfaces 78 and 80 leave between them the second portion of the distribution channel, the grooves 75a and 75b form the casting passageway, and the frustoconical surfaces 79 and 81 fit one against the other to prevent the second plastics material flowing backwards. The front end 74c of the casting passageway 74 is clearly directly open to the second portion of the distribution channel.

The width of the gap forming this second portion is substantially constant and smaller than the depth of the casting passageway. Points $M_1$, $M_2$, and $M_3$ are marked in FIG. 2 for the purpose of explaining more clearly the path of the second plastics material flowing from its inlet into the second inlet channel 14. To go from point $M_1$ to point $M_2$, particles of fluid need only follow a path that is relatively short, whereas the path from point $M_1$ to point $M_3$ is much longer given that it goes round the extrusion channel.

However, because of its special shape, the distribution channel ensures that fluid particles which reach the point $M_1$ simultaneously, also reach the points $M_2$ and $M_3$ simultaneously. From point $M_1$ to $M_2$, the path takes place almost entirely along the second portion 76 of the distribution channel, so it takes place slowly. In contrast, particles of fluid going from point $M_1$ to point $M_3$ begin by travelling round half the circumference to the casting passageway all the way to point $M'_1$, so flow takes place quickly over this portion of the path because of the relatively large section of the casting passageway compared with the section of the second portion of the distribution channel, with a single very short length of the path taking place in the second portion of reduced section from point $M'_1$ to point $M_3$.

To facilitate understanding, the points $M_2$ and $M_3$ are shown as being diametrically opposite. In fact, the helical shape of the casting passageway makes it possible to ensure that particles which reach point M1 simultaneously also reach all of the leading end points 62 of the distribution channel 66 simultaneously. Consequently, flow rate is substantially uniform over said front end, such that the flow parameters are substantially the same over the entire inlet circumference of the adjustment length 60 of the second inlet channel.

The inner hollow part 36 has a front face 84 formed on a front end portion 82 and extending substantially radially from the front end 62 of the distribution channel 66 to the extrusion channel 22.

This front face constitutes the upstream wall of the adjustment length 60. The downstream wall of said adjustment length is constituted by the back face of the downstream part 40 provided with a through hole whose outline 86 constitutes the wall of the extrusion channel, at least over an axial length. The back face 88 of said part is substantially radial, or is at least present in a substantially radial length 87 situated facing the front face 84 of the hollow junction part 82 so as to form the downstream wall of the adjustment length 60. This length is thus constituted by the gap left between the faces 84 and 87.

To vary the section of this channel, at least one of the faces 84 and 87 has at least one projecting zone so that the section of the adjustment length is locally reduced.

In the example shown, the projecting zone is constituted by a step 90 situated on the front face 84 and surrounding the opening thereof, whereas the portion of the back face 87 of the part 40 that serves to constitute the downstream wall of the adjustment length is plane. The front end portion 82 surrounds the extrusion core 24, and the gap left between the internal periphery 83 of said portion 82 and the core 24 constitutes a first portion 22a of the extrusion channel 22. This first portion lies upstream from the entry of the second plastics material 13 into the extrusion channel, and thus constitutes an upstream portion of the channel in which only the second plastics material 11 is present, thereby serving to define the internal portion of the section member.

It is possible for the part 36 to be integrally formed with the end portion 82. However, in the example shown, this end portion is constituted by a junction part 82 installed around the extrusion core at the front end of the hollow part 36 by being engaged therein. In general, it should be observed that the front face 84 is secured to the part 36 (either by being fixed thereto or by being integrally formed therewith). When the junction part 82 is present, the first portion 22a of the extrusion channel corresponds substantially to the length formed between the internal outline 83 of said part 82 and the extrusion core 24.

The extrusion channel has a second portion 22b situated downstream from the admission of the second plastics material 13 and whose wall serves to define the external outline of the section member provided with its outer layer. The profile of the extrusion core preferably remains identical in both portions 22a and 22b of the extrusion channel.

Figure 3:
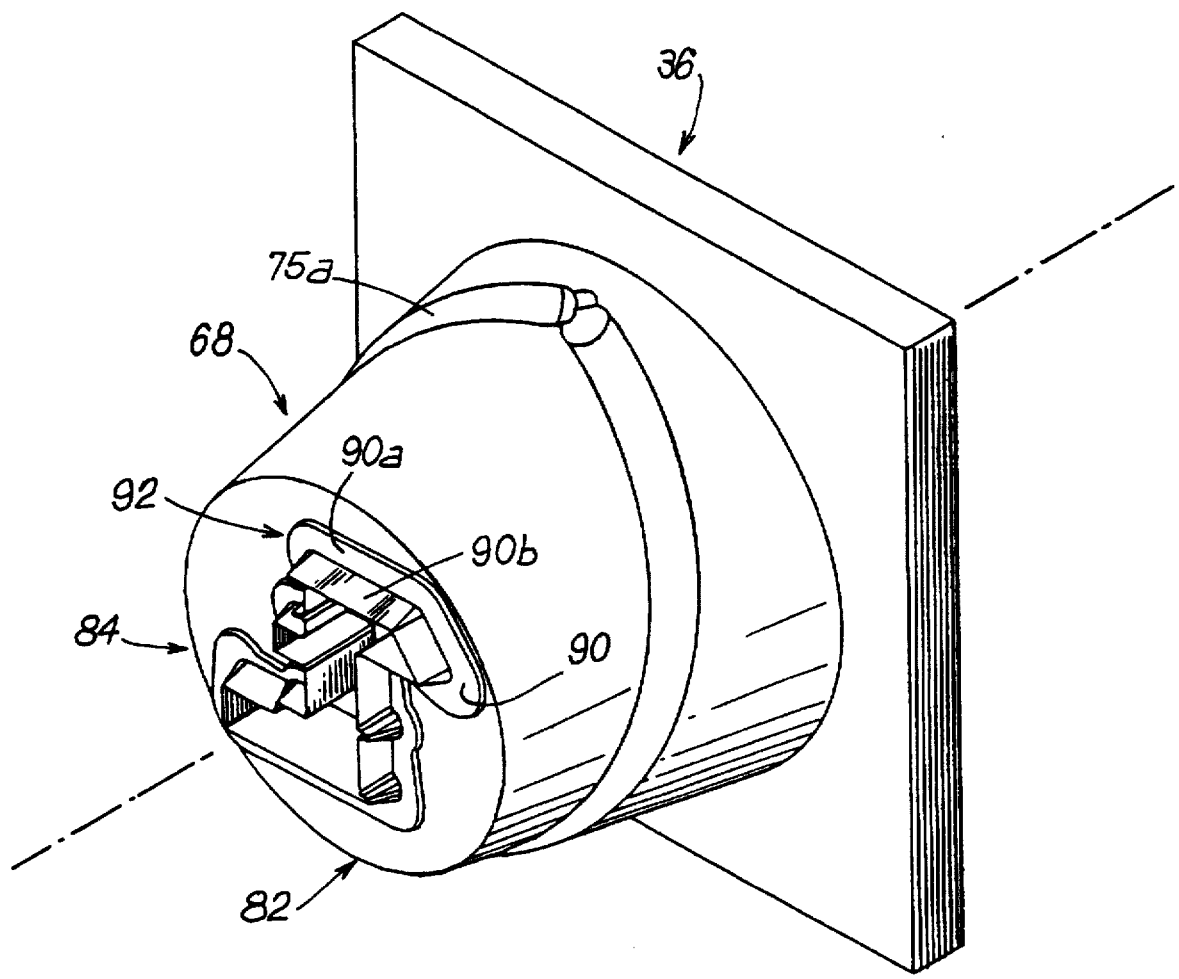
FIG. 3 is a perspective view of a part enabling the diffusion channel and the adjustment portion to be made.
Figure 4:
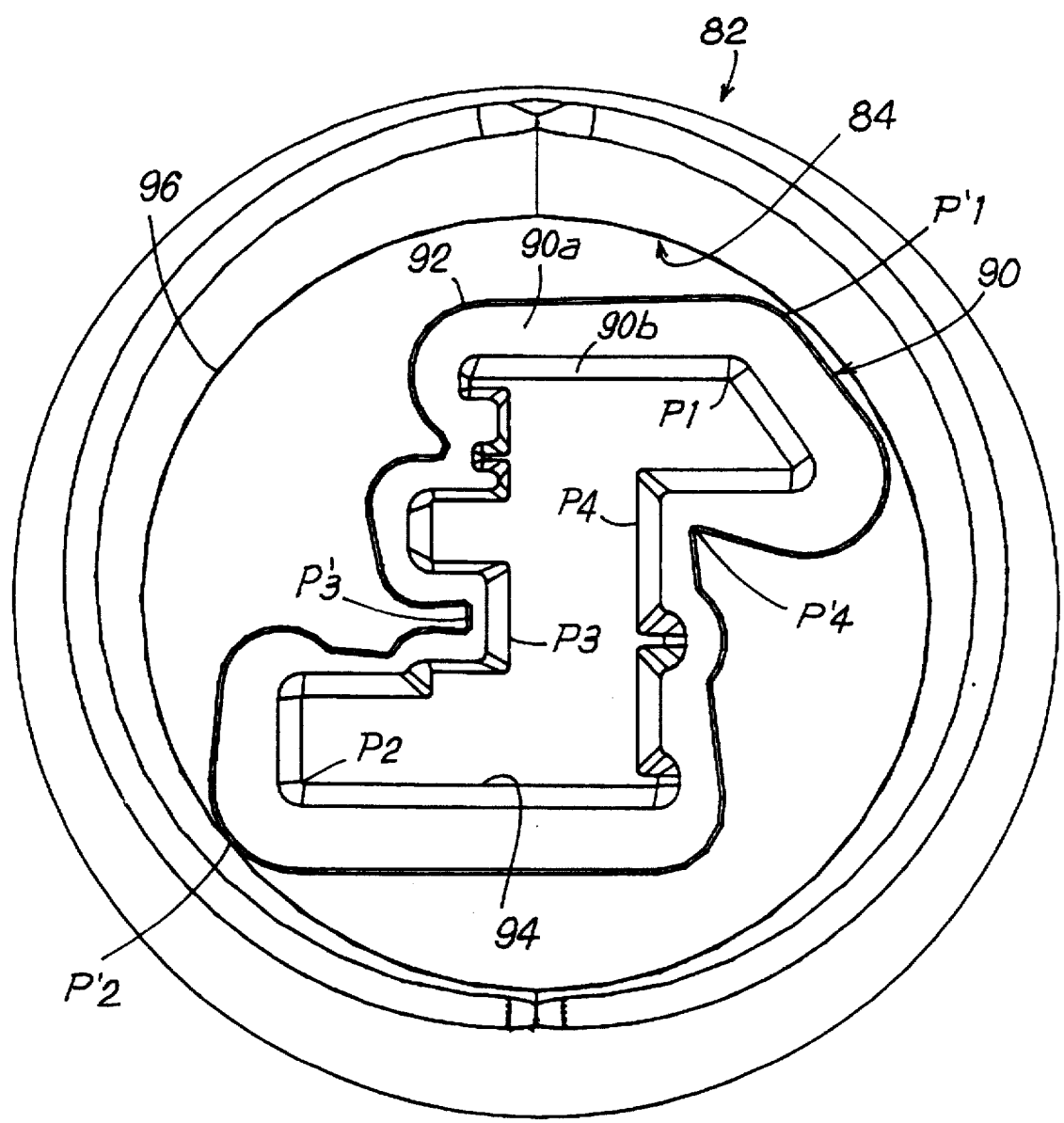
FIG. 4 is a front view of the part shown in FIG. 3.

As can be seen better in FIGS. 3 and 4, the projecting portion or step 90 on the front face 84 has an outer edge 92 and an inner edge 94 that follow the outline of the through hole in said part. Consequently, the shape of this inner edge 94 defines the outline of the internal portion of the section member. The front end 62 of the distribution channel 66 lies at the same level as the circular outer edge 96 of the front face 84.

For points such as the point $P_1$ and $P_2$ of the inner edge 94 that are radially closest to the circular edge 96, and thus to the front end of the distribution channel, the distance between the inner edge 94 and the eternal edge 92 is at a maximum. In other words, the points P'₁ and P'₂ of the outer edge corresponding to the points P₁ and P₂ of the inner edge are situated practically on the circular edge 96. Thus, once the second plastics material begins to reach the circular edge 96, practically all of its path up to the points P₁ and P₂ takes place in a small section region of the adjustment length 60, and thus very slowly.

In contrast, for points such as the points P₃ and P₄ on the inner edge 94 that are located radially furthest from the circular edge 96, the distance between the inner edge and the outer edge is at a minimum. In other words, starting from the moment where the second plastics material reaches the front end of the distribution channel, its path to the points P₃ or P₄ takes place initially, and as far as the points P'₃ and P'₄, in a region of the adjustment length where the section is relatively large, and thus at a flow speed that is relatively fast, and then only over a short portion of the path in a region where the section is reduced.

Because of this shape, particles of fluid of the second plastics material that reach the circular edge 96 at the same time will also reach the points P₁, P₂, P₃, and P₄ at the same time, so the second plastics material is distributed in uniform manner over the outline of the section member.

Advantageously, the projecting portion 90 has a plane length 90a extending transversely relative to the longitudinal direction A of the extrusion core 24 and having a free edge which constitutes the outer edge 92 of said projecting portion. This plane length 90 is of constant thickness, but its width, i.e. its size extending transversely to the axis A of the extrusion core varies, thereby enabling the flow speeds of the second plastics material to be adjusted. It should be observed that the outer edge 92 constitutes an inclined plane providing a smooth transition between the main portion of the face 84 and the projecting portion.

The projecting portion also has a length 90b that slopes towards the extrusion channel, with the free edge thereof constituting the inner edge 94 of said projecting portion. To ensure that the section of the adjustment length remains constant throughout the region of said length provided with the projecting portion 90, and thus likewise in the region where the sloping length 90b extends, the through hole in the downstream part 60 has a rearwardly flared back portion 86' situated facing the sloping length 90b and at a distance therefrom that is substantially constant. Insofar as the flow takes place radially relative to the extrusion direction in the major portion of the adjustment length, the sloping length 90b serves to change the direction of this flow so as to cause it to be substantially tangential to the extrusion direction F at the outlet of the second inlet channel.

It would also be possible to cause the section of the adjustment length 60 to vary continuously from its edge 62. To this end, the front face 84 could be generally convex. Its convexity would be more emphasized in zones where it is desirable for the flow to be slowed down considerably (i.e. in zones where the inner edge 94 is close to the circular edge 96), and more gently in zones where it is desired to avoid slowing down the flow excessively (i.e. in zones where the inner edge 94 is further from the circular edge 96).

It is advantageous for the front face 84 to be easily modified, thereby making it possible to use the same tooling to manufacture different section members having a common kernel, but having outer layers that differ in thickness or in distribution over the outline or merely on some faces only. For this purpose, it is possible to take advantage of using a junction part 82 that is independent and therefore interchangeable.

The wall of the second portion 22b of the extrusion channel is analogous in shape to the first portion 22a. For the purpose of making the outer layer, i.e. adding said layer to the internal portions of the section member extruded in the first portion 22a of the extrusion channel, the e' between the wall of the second portion 22b and the extrusion core 24 is greater than the gap e between the wall of the first portion 22a of the extrusion channel and the extrusion core 24.

Clearly, when only some of the faces of the section members are to be covered in the second plastics material, this difference in gap size would apply only to those facets of the extrusion channel that correspond to said faces.

As can be seen in FIG. 6, the distribution channel 66 and the adjustment length 60 of the second inlet channel enable the section member to be provided with an outer layer 57 that is fine and uniform. This outer layer is marked by a bold line that extends over practically all of the outer surface of the section member.

Nevertheless, as mentioned above, certain zones of the outline of the section member, such as the insides of the grooves 54a, 54b, and 54c, are not provided with an outer layer. This is achieved by specially shaping the extrusion nozzle, whose front face can be seen in FIG. 5. This figure shows the wall 100 of the extrusion channel at its outlet. It can be seen that this wall has exactly the same shape as the external outline of the section member of FIG. 6. It should be observed in particular that ribs 101, 102, and 103 impart their shapes to the grooves 54a, 54b, and 54c. These ribs are present only in the end length of the extrusion channel, and they are missing over the major portion of said channel, and in particular in the portion situated immediately downstream from the outlet of the second inlet channel 14.

Figure 7:
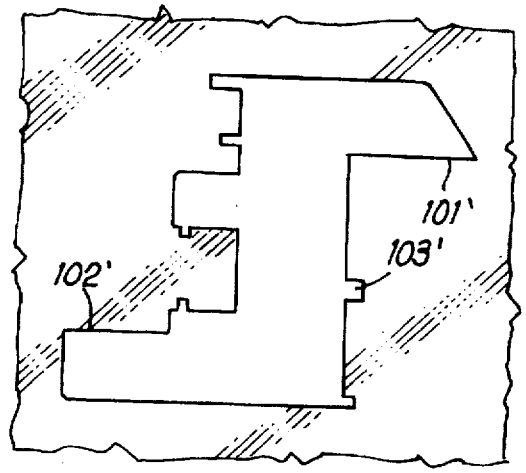
FIG. 7 shows a variant of FIG. 5.

In other words, the extrusion channel has an end length whose wall includes at least one rib that is missing from the wall of the other lengths of said channel and that serves, on said external outline of the section member, to define a groove over which the outer layer is missing. If the extrusion nozzle were of the shape shown in FIG. 7, then the entire outline of the section member would be covered in the outer layer. The nozzle shape shown in FIG. 7 corresponds to the wall of the portion of the extrusion channel that is situated between the outlet 30 of the second inlet channel and the end length of the extrusion channel (there can be seen therein facets which serve to produce the various segments of the external outline of the section member). It can be seen that the ribs 101 and 102 have been added in plane zones 101' and 102', while the rib 103 has been added in a groove 103'.

Figure 5:
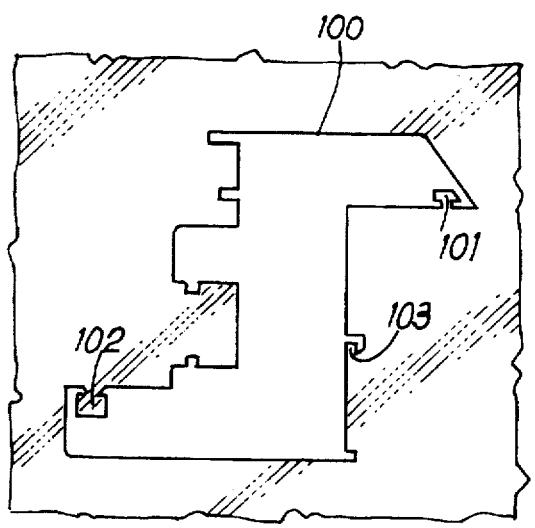
FIG. 5 is a front view of the extrusion nozzle.

Naturally, it would also be possible, without difficulty, to ensure that the outer layer is present even within the grooves 54a, 54b, or 54c, by giving the wall of the extrusion channel the same shape as the nozzle of FIG. 5, beginning from the first portion 22a of said channel.

The device of FIGS. 1 to 3 serves to distribute the outer layer over the entire external outline of the section members, with the possible exception of certain grooves.

However, as mentioned above, it may be desirable to provide the outer layer only over a "covered" portion of the external outline of the section members. Under such circumstances, the outlet end lengths of the second inlet channel corresponding to the "non-covered" portions may be closed. Also, the outlet of the distribution channel may be opened only over one or more ring portions, over which the flow speed of the second plastics material is uniform, and corresponding solely to the covered portion of section members (which covered portion may comprise a plurality of separate parts).

The term "substantially annular" used with respect to said outlet likewise covers this possibility.

In FIG. 8, portions of the device 110 analogous to those of the device 10 are given the same references as in FIGS. 1 to 3, plus 100.

The device 110 serves to make section members having two outer layers. In addition to the first and second inlet channels 112 and 114 for feeding the first and second plastics materials 111 and 113, it includes a third inlet channel 214 that is fed with a third plastics material 213 by a third extruder 218.

As for the second plastics material, the device includes means for controlling the flow of the third plastics material in the third inlet channel 214, and at the outlet end 230 thereof, means for ensuring uniform distribution of said third plastics material over the external outline of the section member or, at least, over a portion of said outline that is to be covered in the third plastics material.

In general, the shape of this third inlet channel is analogous to that of the second inlet channel, and the outlet of the third channel opens out into the extrusion channel 122 downstream from the zone into which the outlet 130 of the second channel 114 opens out.

More precisely, in the example shown, the third inlet channel 214 includes a distribution channel 226 whose generally annular outlet 262 constitutes the inlet of an adjustment portion 260.

An intermediate hollow part 236 whose inner and outer peripheries 270 and 278 are generally frustoconical is engaged on the inner hollow part 136, while the outer hollow part 238 whose inner periphery 272 is generally frustoconical is itself engaged on the intermediate hollow part 236.

Thus, the distribution channel 166 of the second inlet channel 114, together with its passageway 174 in the form of two helical half-turns, is provided between the generally frustoconical outer periphery 178 of the part 136, and the likewise frustoconical inner periphery 270 of the part 236. The adjustment length 160 of said channel is formed between the front face 184 and a downstream wall 186 constituted by the back face of a substantially radial front end portion 282 of the part 236.

The third inlet channel 214 includes a distribution channel 266 formed by a frustoconical gap 276 and a passageway 274 comprising two helical half-turns and formed between the generally frustoconical outer periphery 278 of the intermediate part 236 and the likewise generally frustoconical inner periphery 272 of the outer part 238.

This third channel 214 also includes an adjustment length 260 of varying section formed between the substantially radially front face 286 of the portion 282 of the part 236 and a substantially radial downstream wall 287 formed on the back face of a portion 240 of the part 238.

It should be observed that the portions 282 and 240 may be independent parts or they may be integral with the parts 236 and 238, respectively.

The extrusion channel 122 comprises a first portion 122a situated upstream from the outlet 130 of the channel 114 and of operating section e; a second portion 122b situated between the outlets 130 and 230 and of operating section e' greater than e; and a third portion 122c, situated downstream from the outlet 130 and of operating section e" greater than e'.

The example of FIG. 8 makes it possible to superpose two outer layers that are distributed in uniform manner over the external outline of section members. It would also be possible to cause the outlet 130 to open out over certain facets only of the extrusion channel while causing the outlet 230 to open out over other facets of the channel. Thus, certain portions of the external outline of section members could be covered in the second plastics material while other portions of the same outline are covered in the third plastics material.

To avoid overcrowding FIG. 8, only three inlet channels are shown. In general, it is possible to provide n inlet channels in the same manner as the channels 114 and 214, and to connect them in succession to the extrusion channel which has the first inlet channel connected to the upstream end thereof.

It should also be observed in FIG. 8 that the inlets 128 and 228 of the second and third inlet channels are practically diametrically opposite, for reasons due to the volumes occupied by the extruders 118 and 218. In general, it suffices for the inlets to be angularly offset.

The device described above is used for implementing a method of making a hollow section member having an external outline which, in right cross-section, comprises a plurality of sections, the section member comprising an internal portion or kernel made of a first plastics material and at least one external second portion made of a second plastics material.

For this purpose, the first extruder 16 or 116 is fed from the first inlet channel 12 or 112 with a first molten plastics material 11 or 111, which first plastics material is caused to flow along the intermediate channel 20 or 120 and the extrusion channel 22 or 122 so as to extrude the internal portion of the section member, and at least the second inlet channel 14, 114, or 214 is fed by at least one second extruder 18, 118, or 218 with at least the second molten plastics material 13 so as to establishes a flow of said second plastics material in the extrusion channel, or more precisely over said internal portion of the section member so as to extrude the outer layer over said internal portion of said member.

The above-described device, in either of the variants described, is shaped in such a manner that any zone of turbulence or of flow interruption in any of the plastics materials is avoided.

This is an important aspect of the invention, insofar as plastics material would otherwise run the risk of remaining for too long a time in such zones where it is exposed to high temperatures, and that would degrade it.

The device can be used, at will, for extruding materials that are sensitive to heat or materials that withstand heat.

We claim:

1. An extrusion device for making a hollow section member having an external outline which, in right section, comprises a plurality of segments, being made up of an internal portion made of a first plastics material and at least one outer layer made of a second plastics material and extending over at least a "covered" portion of said external outline, the device comprising:

a first inlet channel;

a first extruder for feeding the first inlet channel with a first molten plastics material;

a body that comprises, in succession on an axis in the flow direction of the first plastics material, an intermediate channel connected to the first inlet channel, and an extrusion channel having a wall which has a plurality of longitudinal facets serving to define the external outline of the section member;

an axial extrusion core having a first length located in the intermediate channel, and a second length located in the extrusion channel, a first gap being left between said second length and the wall of the extrusion channel, said first gap serving to define a shape of the section member, the second length of the core defining the internal outline, and the wall of the extrusion channel defining the external outline of said section member;

a second inlet channel having an inlet and an outlet end which connects with the extrusion channel; and a second extruder designed to feed the second inlet channel with a second molten plastics material;

the device including means for controlling a flow of the second plastics material in the second inlet channel and for ensuring that said second plastics material is uniformly distributed over said covered portion of the external outline of the section member at the outlet end of the second inlet channel, the device also including an inner hollow part having a through hole through which the extrusion core passes, and an outer hollow part suitable for engaging on said inner hollow part, said parts, when engaged one with the other, forming between them a distribution channel for the second plastics material, said channel for the second plastics material, said channel constituting a portion of the second inlet channel and comprising a first portion in the form of two helical half-turns that are symmetrical about a plane of symmetry of an outer periphery of the inner hollow part, with their two ends meeting in said plane to form a continuous casting passageway, a first junction zone between the half-turns being situated behind a second junction zone between said half-turns and being directly coupled to the inlet of the second inlet channel, the distribution channel further including a second portion which extends between said continuous casting passageway and a front end of said distribution channel, and which is constituted by a second gap left between facing faces of the outer periphery of the inner part and an inner periphery of the outer part, wherein the inner hollow part includes a front end portion having a front face which extends substantially radially between the front end of the distribution channel and the extrusion channel;

wherein the device includes a downstream part provided with a through hole having an outline which constitutes, at least in an axial length thereof, the wall of the extrusion channel, said downstream part having a back face that is substantially radial and situated facing the front face of said front end portion;

wherein the second inlet channel includes an adjustment length constituted by a third gap which is left between the back face of the downstream part and the front face of the front end portion; and wherein said adjustment length has variations in the section thereof constituting means for acting on a substantially uniform flow rate of the second plastics material over the front end of the distribution channel to adjust the flow speed of the second plastics material towards a given facet of the wall of the extrusion channel as a function of the distance measured along a flow path of the second plastics material between an inlet of the adjustment length and said facet, the variations in the section of the adjustment length being implemented by means of at least one projecting zone which extends from at least a first one of said back face of the downstream part and said front face of the front end portion towards a second one of the said faces, said projecting zone locally reducing a section of said adjustment length.

2. A device according to claim 1, wherein the outer periphery of the inner hollow part is generally in the form of a backwardly-flaring truncated cone, the second portion of the distribution channel thus being formed between two frustoconial surfaces having the same angle at the apex and respectively formed on the outer periphery of the inner part and on the inner periphery of the outer part, the width of said second gap constituting said second portion being substantially constant and less than the depth of the casting passageway.

3. A device according to claim 1, wherein the back face of the downstream part is substantially plane, wherein the front end portion surrounds the extrusion corn, and an interval left between the inner periphery of said portion and the extrusion core constitutes a first portion of the extrusion channel serving to define the internal portion of the section member, said channel comprising a second portion situated downstream from the first portion with the wall thereof serving to define the external outline of the section member provided with its outer layer, wherein the front face of the front end portion includes a projecting portion having an outer edge and an inner edge which follows the outline of the inner periphery of the front end portion, and wherein, for the points of said inner edge that are radially closest to the front end of the distribution channel the distance between the inner edge and the outer edge is at a maximum, whereas for the points of the inner edge that are radially furthest from the front end of the distribution channel the distance between the inner edge and the outer edge is at a minimum.

4. A device according to claim 3, wherein the projecting portion has a plane length extending transversely relative to the longitudinal direction of the extrusion core and whose free edge constitutes the outer edge of said projecting portion, and a length sloping towards the extrusion channel and having a free edge constituting the inner edge of said portion, and wherein the through hole in the downstream part has a backwardly-flaring back portion situated facing said sloping portion and at substantially constant distance therefrom.

5. A device according to claim 1, wherein the wall of the second portion of the extrusion channel is analogous in shape to the first portion of said channel, with the interval between the wall of said second portion and the extrusion core being greater than the interval between the wall of the first portion of the extrusion channel and the extrusion core.

6. A device according to claim 1, wherein the extrusion channel includes an end length whose wall includes at least one rib missing from the wall of the other lengths of said channel and serving to define a groove in the external outline of the section member over which the outer layer is absent.

7. A device according to claim 1, including a third inlet channel fed with a third molten plastics material by a third extruder, said third inlet channel having an inlet and having an outlet end coupled to the extrusion channel downstream from the zone where the outlet end of the second inlet channel couples with said extrusion channel, the third inlet channel being analogous in configuration to the second inlet channel.

8. A device according to claim 7, wherein for n being an integer greater than 1, the device has n+1 inlet channels, comprising in addition to the first and second inlet channels, n−1 other inlet channels, of shape analogous to that of the second inlet channel, with the respective outlet ends thereof coupling in succession with the extrusion channel going from the upstream end towards the downstream end.

9. A method of making a hollow section member having an external outline which, in right section, comprises a plurality of segments, being made up of an internal portion made of a first plastics material and at least one outer layer made of a second plastics material and extending over at least a "covered" portion of said external outline, the method comprising the steps of:

feeding a first molten plastics material from an extruder into a first inlet channel from an extrusion device, flowing said molten plastics material successively through an intermediate channel formed around a first length of an axial extrusion core and through an extrusion channel formed around a second length of said axial extrusion core, said extrusion channel having a wall which has a plurality of longitudinal facets serving to define the external outline of the section member, feeding a second molten plastics material from a second extruder into a second inlet channel having an outlet connecting with the extrusion channel, controlling a flow of said second molten plastics material in the second inlet channel and ensuring that said second plastics material is uniformly distributed over said covered portion of the external outline of the section member at said outlet of said second inlet channel, forming a distribution channel for the second plastics material between an inner hollow part through which the extrusion core passes and an outer hollow part, flowing said second plastics material through a first portion of the distribution channel, said first portion being in the form of two helical half-turns that are symmetrical about a plane of symmetry of an outer periphery of said inner hollow part, a first junction zone of said half-turns being situated behind a second junction zone thereof and being directly coupled to the inlet of the second inlet channel, flowing the second plastics material through a second portion of the distribution channel extending between the first portion and a front end thereof and thereby obtaining a substantially uniform flow rate of the second plastics material over said front end, providing an adjustment length of the second inlet channel while leaving a gap between a back face of a downstream part having a through hole which, at least in an axial length thereof, forms the wall of the extrusion channel, and a front face of a front end portion which extends substantially radially between the front end of the distribution channel and the extrusion channel, flowing said plastics material through said adjustment length, while acting on said substantially uniform flow rate of the second plastics material over said front end of said distribution channel to adjust the flow speed of the second plastics material towards a given facet of the wall of the extrusion channel as a function of the distance measured along a flow path of the second plastics material between an inlet of the adjustment length and said facet, and allowing said second plastics material to flow towards said facet through an outlet of the adjustment length, so as to provide a covered portion for the plastics material flowing through the extrusion channel.

10. Method according to claim 9, wherein for n being an integer greater than 1, it further comprises the steps of:

providing n+1 inlet channels, comprising n−1 other inlet channels in addition to the first and second inlet channels, of shape analogous to that of the second inlet channel, said n−1 inlet channels having respective outlet ends coupling in succession with the extrusion channel going from the upstream end towards the downstream end thereof; and flowing n−1 molten plastics materials through said n−1 inlet channels and, for each of these n−1 plastics materials, reproducing the steps realized while flowing said second plastics material.

* * * * *